(12) United States Patent
Busayarat et al.

(10) Patent No.: US 11,886,870 B2
(45) Date of Patent: *Jan. 30, 2024

(54) MAINTAINING AND UPDATING SOFTWARE VERSIONS VIA HIERARCHY

(71) Applicant: Home Box Office, Inc., New York, NY (US)

(72) Inventors: Sata Busayarat, Seattle, WA (US); Allen Arthur Gay, Shoreline, WA (US); Jinjiang Zeng, Mercer Island, WA (US)

(73) Assignee: HOME BOX OFFICE, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/854,135

(22) Filed: Apr. 21, 2020

(65) Prior Publication Data

US 2020/0249939 A1 Aug. 6, 2020

Related U.S. Application Data

(63) Continuation of application No. 15/449,229, filed on Mar. 3, 2017, now Pat. No. 10,656,935, which is a
(Continued)

(51) Int. Cl.
*G06F 8/71* (2018.01)
*G06F 8/65* (2018.01)
(Continued)

(52) U.S. Cl.
CPC .................. *G06F 8/71* (2013.01); *G06F 8/65* (2013.01); *G06F 16/951* (2019.01);
(Continued)

(58) Field of Classification Search
CPC . G06F 8/71; G06F 16/951; G06F 8/65; H04L 12/4625; H04L 65/4084;
(Continued)

(56) References Cited

U.S. PATENT DOCUMENTS 6,025,837 A 2/2000 Matthews, III et al.
7,302,430 B1 11/2007 Nagda et al.
(Continued)

FOREIGN PATENT DOCUMENTS

EP 0 848 554 A2 6/1998
WO 97/13368 A1 4/1997
(Continued)

OTHER PUBLICATIONS

Non-Final Office Action received for U.S. Appl. No. 16/157,649 dated Jun. 15, 2021, 28 pages.
(Continued)

*Primary Examiner* — Patrice L Winder
(74) *Attorney, Agent, or Firm* — Amin, Turocy & Watson, LLP

(57) ABSTRACT

The described technology is directed towards maintaining and using a version-based hierarchy of software resources (e.g., file system files) to return version-specific responses to clients. A client sends its version information with each data request, and gets back a response based upon that version. Version changes are made by maintaining the current version of each software code resource and overriding the current version with a previous version for clients as needed. The technology allows updates (e.g., for new devices and new software resource versions) to be supported by inserting resources into the resource hierarchy and moving resources therein based upon versioning. A system based on deltas is also contemplated, in which only parts of a file may be changed relative to a different version, instead of overriding the entire file.

20 Claims, 11 Drawing Sheets

Related U.S. Application Data continuation-in-part of application No. 15/290,722, filed on Oct. 11, 2016, now Pat. No. 10,708,380, which is a continuation-in-part of application No. 15/285,439, filed on Oct. 4, 2016, now Pat. No. 10,623,514.

(60) Provisional application No. 62/240,888, filed on Oct. 13, 2015.

(51) Int. Cl.

| | |
|---|---|
| *H04L 12/46* | (2006.01) |
| *H04N 21/43* | (2011.01) |
| *H04L 67/00* | (2022.01) |
| *H04N 21/458* | (2011.01) |
| *H04N 21/482* | (2011.01) |
| *H04N 21/433* | (2011.01) |
| *H04N 21/81* | (2011.01) |
| *H04N 21/262* | (2011.01) |
| *H04L 67/02* | (2022.01) |
| *H04N 21/443* | (2011.01) |
| *H04N 21/25* | (2011.01) |
| *G06F 16/951* | (2019.01) |
| *H04L 65/612* | (2022.01) |
| *H04L 65/75* | (2022.01) |
| *H04L 67/60* | (2022.01) |
| *H04L 67/568* | (2022.01) |
| *H04L 67/1004* | (2022.01) |

(52) U.S. Cl.
CPC ........ *H04L 12/4625* (2013.01); *H04L 65/612* (2022.05); *H04L 65/765* (2022.05); *H04L 67/02* (2013.01); *H04L 67/34* (2013.01); *H04L 67/568* (2022.05); *H04L 67/60* (2022.05); *H04N 21/251* (2013.01); *H04N 21/26291* (2013.01); *H04N 21/43* (2013.01); *H04N 21/4332* (2013.01); *H04N 21/4431* (2013.01); *H04N 21/4586* (2013.01); *H04N 21/4821* (2013.01); *H04N 21/4826* (2013.01); *H04N 21/8166* (2013.01); *H04L 67/1004* (2013.01)

(58) Field of Classification Search
CPC ... H04L 65/605; H04L 67/02; H04L 67/2842; H04L 67/32; H04L 67/34; H04L 65/612; H04L 65/765; H04L 67/568; H04L 67/60; H04L 67/1004; H04N 21/251; H04N 21/26291; H04N 21/43; H04N 21/4332; H04N 21/4431; H04N 21/4586; H04N 21/4821; H04N 21/4826; H04N 21/8166; H04N 21/482
See application file for complete search history.

(56) References Cited

U.S. PATENT DOCUMENTS

| | | | |
|---|---|---|---|
| 7,373,459 B2 | 5/2008 | Aoki et al. | |
| 7,383,535 B1 * | 6/2008 | Kshetrapal | G06F 9/44536 717/169 |
| 7,620,653 B1 | 11/2009 | Swartz | |
| 7,689,723 B1 | 3/2010 | DiMambro | |
| 7,769,805 B1 | 8/2010 | Barnes et al. | |
| 7,793,206 B2 | 9/2010 | Lim et al. | |
| 7,978,631 B1 | 7/2011 | Abdelaziz et al. | |
| 8,725,849 B1 | 5/2014 | Lloyd | |
| 8,849,825 B1 | 9/2014 | McHugh et al. | |
| 8,949,161 B2 | 2/2015 | Borst et al. | |
| 8,990,869 B2 | 3/2015 | Hasek | |
| 9,031,995 B1 | 5/2015 | Raden, II et al. | |
| 9,166,862 B1 | 10/2015 | Davis et al. | |
| 9,189,220 B2 * | 11/2015 | Gill | G06F 8/61 |
| 9,294,796 B2 | 3/2016 | McDonough et al. | |
| 9,313,024 B1 * | 4/2016 | Stute | H04L 67/02 |
| 9,419,852 B1 | 8/2016 | Heller et al. | |
| 9,454,356 B2 * | 9/2016 | Qin | G06F 9/445 |
| 9,667,515 B1 * | 5/2017 | Thimsen | G06F 9/5077 |
| 9,710,247 B2 * | 7/2017 | Conlan | G06Q 30/0601 |
| 9,747,382 B1 | 8/2017 | Warman et al. | |
| 9,817,646 B1 | 11/2017 | Chen et al. | |
| 9,875,262 B2 | 1/2018 | McHugh et al. | |
| 9,887,885 B2 | 2/2018 | Varney et al. | |
| 9,891,938 B2 | 2/2018 | Barry et al. | |
| 9,894,119 B2 | 2/2018 | Pearl et al. | |
| 9,928,308 B1 | 3/2018 | Tsun et al. | |
| 9,953,036 B2 | 4/2018 | Mackenzie et al. | |
| 10,013,500 B1 * | 7/2018 | McClintock | H04L 67/02 |
| 10,028,011 B2 | 7/2018 | Yao et al. | |
| 10,042,626 B2 | 8/2018 | Nekrestyanov et al. | |
| 10,148,762 B2 | 12/2018 | Rogers et al. | |
| 10,277,704 B2 | 4/2019 | Busayarat et al. | |
| 10,191,954 B1 | 6/2019 | Corley et al. | |
| 10,320,879 B2 | 6/2019 | Nekrestyanov et al. | |
| 10,884,589 B2 | 1/2021 | Pike et al. | |
| 10,949,191 B2 * | 3/2021 | Chen | G06F 16/188 |
| 2001/0034771 A1 | 10/2001 | Hutsch et al. | |
| 2002/0143591 A1 | 10/2002 | Connelly | |
| 2003/0037206 A1 | 2/2003 | Benfield et al. | |
| 2003/0038836 A1 | 2/2003 | Ronald et al. | |
| 2003/0039230 A1 | 2/2003 | Ostman et al. | |
| 2003/0097357 A1 | 5/2003 | Ferrari et al. | |
| 2003/0191753 A1 | 10/2003 | Hoch | |
| 2004/0082352 A1 | 4/2004 | Keating et al. | |
| 2004/0098744 A1 | 5/2004 | Gutta | |
| 2004/0128618 A1 | 7/2004 | Datta | |
| 2004/0139480 A1 | 7/2004 | Delpuch et al. | |
| 2005/0027871 A1 | 2/2005 | Bradley et al. | |
| 2005/0289168 A1 | 12/2005 | Green et al. | |
| 2006/0026655 A1 | 2/2006 | Perez | |
| 2006/0236221 A1 | 10/2006 | McCausland et al. | |
| 2007/0130163 A1 | 6/2007 | Perez et al. | |
| 2008/0040683 A1 | 2/2008 | Walsh | |
| 2008/0186276 A1 | 8/2008 | Mayer-Ullmann | |
| 2009/0125809 A1 | 5/2009 | Trapani et al. | |
| 2009/0138441 A1 | 5/2009 | Valentine et al. | |
| 2009/0164414 A1 | 6/2009 | Tatzel et al. | |
| 2009/0193044 A1 | 7/2009 | Buehrer et al. | |
| 2009/0210868 A1 * | 8/2009 | Parthasarathy | G06F 8/71 717/169 |
| 2009/0282432 A1 | 11/2009 | Hahnefeld et al. | |
| 2010/0058390 A1 | 3/2010 | Harris et al. | |
| 2010/0063878 A1 | 3/2010 | Bachet et al. | |
| 2010/0070447 A1 * | 3/2010 | Pfuntner | G06F 11/3006 706/47 |
| 2010/0229045 A1 * | 9/2010 | Schultz | G06F 8/60 714/37 |
| 2010/0257204 A1 | 10/2010 | Orlov et al. | |
| 2011/0099277 A1 | 4/2011 | Yao et al. | |
| 2011/0145327 A1 | 6/2011 | Stewart | |
| 2011/0184899 A1 | 7/2011 | Gadanho et al. | |
| 2011/0239243 A1 | 9/2011 | Dierks et al. | |
| 2011/0246471 A1 | 10/2011 | Rakib | |
| 2011/0289458 A1 | 11/2011 | Yu et al. | |
| 2011/0289533 A1 | 11/2011 | White et al. | |
| 2011/0314326 A1 | 12/2011 | Mahajan et al. | |
| 2012/0174158 A1 | 7/2012 | Mowrey et al. | |
| 2012/0197908 A1 | 8/2012 | Unno | |
| 2012/0215684 A1 | 8/2012 | Kidron | |
| 2012/0313966 A1 | 12/2012 | Kamekawa | |
| 2013/0024851 A1 * | 1/2013 | Firman | G06F 8/60 717/170 |
| 2013/0031204 A1 | 1/2013 | Graham et al. | |
| 2013/0046849 A1 | 2/2013 | Wolf et al. | |
| 2013/0124309 A1 | 5/2013 | Traasdahl et al. | |
| 2013/0346539 A1 | 12/2013 | Sivasubramanian et al. | |
| 2013/0347018 A1 | 12/2013 | Limp et al. | |
| 2014/0006951 A1 | 1/2014 | Hunter | |
| 2014/0040301 A1 | 2/2014 | Chadha et al. | |
| 2014/0047073 A1 | 2/2014 | Beme | |

(56) References Cited

U.S. PATENT DOCUMENTS

| | | |
|---|---|---|
| 2014/0181137 A1 | 6/2014 | Stein |
| 2014/0201802 A1 | 7/2014 | Boss et al. |
| 2014/0223099 A1 | 8/2014 | Kidron |
| 2014/0223303 A1 | 8/2014 | Cox et al. |
| 2014/0280108 A1 | 9/2014 | Dunn et al. |
| 2014/0344663 A1 | 11/2014 | Joel et al. |
| 2015/0026238 A1 | 1/2015 | Natarajan |
| 2015/0040098 A1* | 2/2015 | Akins .................. G06F 8/36 717/106 |
| 2015/0051749 A1 | 2/2015 | Green et al. |
| 2015/0149544 A1 | 5/2015 | Zhang |
| 2015/0195621 A1 | 7/2015 | Harron et al. |
| 2015/0201001 A1 | 7/2015 | Cabanillas et al. |
| 2015/0201033 A1 | 7/2015 | Gupta |
| 2015/0220326 A1* | 8/2015 | Jia .................. H04M 1/72406 717/170 |
| 2015/0220649 A1* | 8/2015 | Papa .................. G06Q 30/0185 707/722 |
| 2015/0235275 A1 | 8/2015 | Shah et al. |
| 2015/0256903 A1 | 9/2015 | Walker |
| 2015/0269146 A1* | 9/2015 | Ayyar .................. G06F 16/93 707/608 |
| 2015/0277710 A1 | 10/2015 | Lee et al. |
| 2015/0278219 A1 | 10/2015 | Phipps |
| 2015/0304447 A1* | 10/2015 | Karp .................. H04L 67/303 709/203 |
| 2015/0358818 A1 | 12/2015 | Dipaola |
| 2015/0378685 A1* | 12/2015 | Kaplinger .......... H04L 67/535 717/104 |
| 2016/0006645 A1 | 1/2016 | Rave |
| 2016/0070447 A1 | 3/2016 | Righter et al. |
| 2016/0085772 A1 | 3/2016 | Vermeulen et al. |
| 2016/0086260 A1 | 3/2016 | Vermeulen et al. |
| 2016/0105710 A1 | 4/2016 | Watson et al. |
| 2016/0110412 A1 | 4/2016 | Sun et al. |
| 2016/0140002 A1 | 5/2016 | Fee et al. |
| 2016/0191985 A1 | 6/2016 | Tirpak |
| 2016/0205428 A1 | 7/2016 | McDonough et al. |
| 2016/0267523 A1 | 9/2016 | Biswas et al. |
| 2016/0328485 A1 | 11/2016 | Dodonov et al. |
| 2016/0337426 A1 | 11/2016 | Shribman et al. |
| 2016/0371750 A1 | 12/2016 | Peddinti et al. |
| 2017/0006036 A1 | 1/2017 | Bellingham |
| 2017/0032005 A1 | 2/2017 | Zheng et al. |
| 2017/0041296 A1 | 2/2017 | Ford et al. |
| 2017/0083941 A1 | 3/2017 | Biswas et al. |
| 2017/0103553 A1 | 4/2017 | Busayarat et al. |
| 2017/0104838 A1 | 4/2017 | Busayarat et al. |
| 2017/0104842 A1 | 4/2017 | Busayarat et al. |
| 2017/0105049 A1 | 4/2017 | Busayarat et al. |
| 2017/0177333 A1 | 6/2017 | Busayarat et al. |
| 2017/0214764 A1 | 7/2017 | Bakshi et al. |
| 2017/0323028 A1 | 11/2017 | Jonker et al. |
| 2017/0353577 A1 | 12/2017 | Lutz et al. |
| 2018/0039647 A1 | 2/2018 | Winstanley et al. |
| 2018/0060248 A1 | 3/2018 | Liu et al. |
| 2018/0131633 A1 | 5/2018 | Li |
| 2018/0183891 A1 | 6/2018 | Zhang et al. |
| 2019/0095395 A1 | 3/2019 | Piecko |

FOREIGN PATENT DOCUMENTS

| | | |
|---|---|---|
| WO | 2007/054687 A1 | 5/2007 |
| WO | 2011/102824 A2 | 8/2011 |
| WO | 2017004138 A1 | 1/2017 |

OTHER PUBLICATIONS

Non-Final Office Action received for U.S. Appl. No. 16/818,109 dated Apr. 23, 2021, 85 pages.
Stack Overflow, What does ii mean to hydrate an object?, Aug. 9, 2011 and Dec. 23, 2013, https://stackoverflow.com/questions/6991135/what-does-it-mean-to-hydrate-an-objecl/20787106#20787106,Accessed Apr. 14, 2021, 5 pages.
International Preliminary Report on Patentability received for PCT application No. PCT/US2019/055851 dated Apr. 22, 2021, 8 pages.
Final Office Action received for U.S. Appl. No. 16/818,109 dated Oct. 15, 2021, 56 pages.
Non-Final Office Action received for U.S. Appl. No. 16/889,129 dated Nov. 23, 2021, 81 pages.
Non-Final Office Action received for U.S. Appl. No. 16/157,649 dated Sep. 14, 2021, 52 pages.
Final Office Action received for U.S. Appl. No. 16/290,224 dated Oct. 21, 2020, 40 pages.
International Search Report and Written Opinion received for International Application Serial No. PCT/US2016/056755 dated Dec. 19, 2016, 15 pages.
Non-Final Office Action received for U.S. Appl. No. 15/285,439 dated Jul. 27, 2017, 27 pages.
Notice of Allowance received for U.S. Appl. No. 15/252,166 dated Mar. 22, 2018, 40 pages.
Final Office Action received for U.S. Appl. No. 15/285,439 dated Feb. 2, 2018, 23 pages.
El-Ansary et al., "An Overview of Structured P2P Overlay Networks," in: Handbook on Theoretical and Algorithmic Aspects of Sensor, Ad Hoc Wireless, and Peer-to-Peer Networks 1 led] Jie Wu, Auerbach Publications, 2006, 27 pages.
Non-Final Office Action received for U.S. Appl. No. 15/291,247 dated Jun. 14, 2018, 70 pages.
Non-Final Office Action received for U.S. Appl. No. 15/290,722 dated Jun. 28, 2018, 29 pages.
Office Action received for Colombian Patent Application Serial No. NC2018/0005094 dated Aug. 22, 2018, 3 pages (including English translation).
Non-Final Office Action received for U.S. Appl. No. 15/285,439 dated Jul. 25, 2018, 32 pages.
European Office Action received for EP Patent Application Serial No. 16787677.0 dated May 30, 2018, 3 pages.
Office Action received for Chinese Patent Application Serial No. 201690001472.1 dated Aug. 17, 2018, 2 pages.
Non-Final Office Action received for U.S. Appl. No. 15/291,810 dated Nov. 19, 2018, 43 pages.
Final Office Action received for U.S. Appl. No. 15/285,439 dated Jan. 30, 2019, 41 pages.
International Search Report and Written Opinion received for International Application Serial No. PCT/US2018/030717 dated Aug. 7, 2018, 16 pages.
Final Office Action received for U.S. Appl. No. 15/290,722 dated Feb. 25, 2019, 33 pages.
Communication pursuant to Article 94(3) EPC received for EP Application Serial No. 16787677.0 dated Mar. 13, 2019, 8 pages.
Non-Final Office Action received for U.S. Appl. No. 15/584,142 dated Apr. 29, 2019, 144 pages.
Non-Final Office Action received for U.S. Appl. No. 15/449,229 dated Jun. 28, 2019, 52 pages.
Notice of Allowance for U.S. Appl. No. 15/291,810 dated Apr. 22, 2019, 22 pages.
Non-Final Office Action received for U.S. Appl. No. 15/290,722 dated Sep. 9, 2019, 23 pages.
Non-Final Office Action received for U.S. Appl. No. 15/285,439 dated Jul. 25, 2019, 39 pages.
Second Office Action received for Colombian Application Serial No. NC2018/0005094 dated Jul. 4, 2019, 30 pages (with English translation).
Notice of Allowance received for U.S. Appl. No. 16/054,278 dated Dec. 18, 2019, 58 pages.
Final Office Action received for U.S. Appl. No. 15/584,142 dated Nov. 6, 2019, 155 pages.
International Search Report and Written Opinion for International Application Serial No. PCT/US2019/055851 dated Nov. 22, 2019, 13 pages.
Summons to attend oral proceedings pursuant to Rule 115(1) EPC received for EP Application Serial No. 16787677.0 dated Dec. 6, 2019, 7 pages.

(56) References Cited

OTHER PUBLICATIONS

Notice of Allowance received for U.S. Appl. No. 15/584,142 dated Feb. 21, 2020, 30 pages.
U.S. Appl. No. 15/449,229, filed Mar. 3, 2017.
U.S. Appl. No. 15/290,722, filed Oct. 11, 2016.
U.S. Appl. No. 15/285,439, filed Oct. 4, 2016.
Non-Final Office Action received for U.S. Appl. No. 16/561,572 dated Sep. 23, 2020, 45 pages.
Decision to refuse a European Patent application received for European Patent Application Serial No. 16787677.0 dated Jul. 22, 2020, 26 pages.
Non-Final Office Action received for U.S. Appl. No. 16/290,224 dated Apr. 22, 2020, 87 pages.
Non-Final Office Action received for U.S. Appl. No. 16/889,149 dated Jan. 19, 2022, 56 pages.
Final Office Action received for U.S. Appl. No. 16/157,649 dated Apr. 22, 2022, 59 pages.
Non-Final Office Action received for U.S. Appl. No. 16/818,109 dated Jul. 7, 2022, 64 pages.
Notice of Allowance received for U.S. Appl. No. 16/157,649 dated Dec. 21, 2022, 38 pages.
Final Office Action received for U.S. Appl. No. 16/818,109 dated Dec. 7, 2022, 76 pages.
Office Action received for Canadian Patent Application Serial No. 3002055 dated Nov. 23, 2022, 4 pages.
Office Action received for Mexican Patent Application Serial No. MX/a/2018/004690 dated Oct. 11, 2022, 11 pages (Original Copy).
EP Office Action for received for European Patent Application Serial No. 19795414.2 dated Jan. 12, 2023, 7 pages.
Mexican Office Action for Mexican Application Serial No. MX/a/2018/004690 dated Jul. 14, 2022, 6 pages.
Notice of Allowance received for U.S. Appl. No. 16/889,149 dated Sep. 29, 2022, 41 pages.
Non-Final Office Action received for U.S. Appl. No. 16/157,649 dated Sep. 1, 2022, 64 pages.
Non-Final Office Action received for U.S. Appl. No. 16/818,109 dated Jun. 30, 2023, 83 pages.
Office Action received for Mexico Patent Application Serial No. MX/a/2018/004690 dated Apr. 4, 2023, 22 pages (Including English Translation).
Non-Final Office Action received for U.S. Appl. No. 16/157,649 dated Jan. 19, 2021, 86 pages.
Office Action received for Mexico Patent Application Serial No. MX/a/2018/004690 dated Sep. 19, 2023, 26 pages (Including English Translation).

\* cited by examiner

MAINTAINING AND UPDATING SOFTWARE VERSIONS VIA HIERARCHY

CROSS-REFERENCE TO RELATED APPLICATIONS

The present application is a continuation of U.S. patent application Ser. No. 15/449,229 filed Mar. 3, 2017, entitled "MAINTAINING AND UPDATING SOFTWARE VERSIONS VIA HIERARCHY," which is a continuation in-part of U.S. patent application Ser. No. 15/290,722 filed Oct. 11, 2016, and also a continuation-in-part of application Ser. No. 15/285,439 filed Oct. 4, 2016, each of which claims priority to U.S. provisional patent application Ser. No. 62/240,888, filed Oct. 13, 2015. The entireties of the aforementioned applications are hereby incorporated herein by reference.

BACKGROUND

Over time, newer client device types and classes of devices (e.g., smartphones, tablets, personal computers and so forth) are introduced into the marketplace, each of which has different capabilities relative to other device types and classes. As a result, various versions of software code evolve, including the APIs and other mechanisms that such clients use to exchange data with a data service. Similarly, software versions change for other reasons, such as when new data properties are introduced, or when others become obsolete or irrelevant.

Some of the changes may be "breaking" changes, in that older version client software fails once a newer version is in use at the data service. For example, a set of data sent to a client may have a new data property, which version 3.0 client software expects, but which causes version 2.0 or below clients to fail. Similarly, a data property that is no longer needed may be removed from a newer version. Such version changes can break the client software code in that a client may get some unexpected data that the client software is not configured to handle, or be missing a piece of data that client software is expecting.

A typical way to ensure that the correct version of software is used with a given client is to maintain and run different sets of the various software versions at the data service, and individually match each client device to the appropriate one of the sets, e.g., via a load balancer or the like that routes different clients to different, version-appropriate servers. As there can be many different types of client devices and software versions, managing the relatively large number of such versions becomes very complex. An alternative solution is to maintain multiple code paths within code for each software version (e.g., "if version 2.0 then do X, if version 3.0 then do Y, if version 4.0 then do Z"). This solution tends to become unmaintainable after even a small number of version-based alternate code paths.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards maintaining a hierarchy of software entities (e.g., data structures such as files), including different sub-hierarchies corresponding to different versions of at least some of the software entities. Aspects include receiving from a requestor a version identifier and a request for a software entity set comprising one or more software entities corresponding to that version identifier, accessing the hierarchy of software entities to select a version-based software entity set selected at least in part via the version identifier; and returning information corresponding to the selected software entity set to the requestor.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
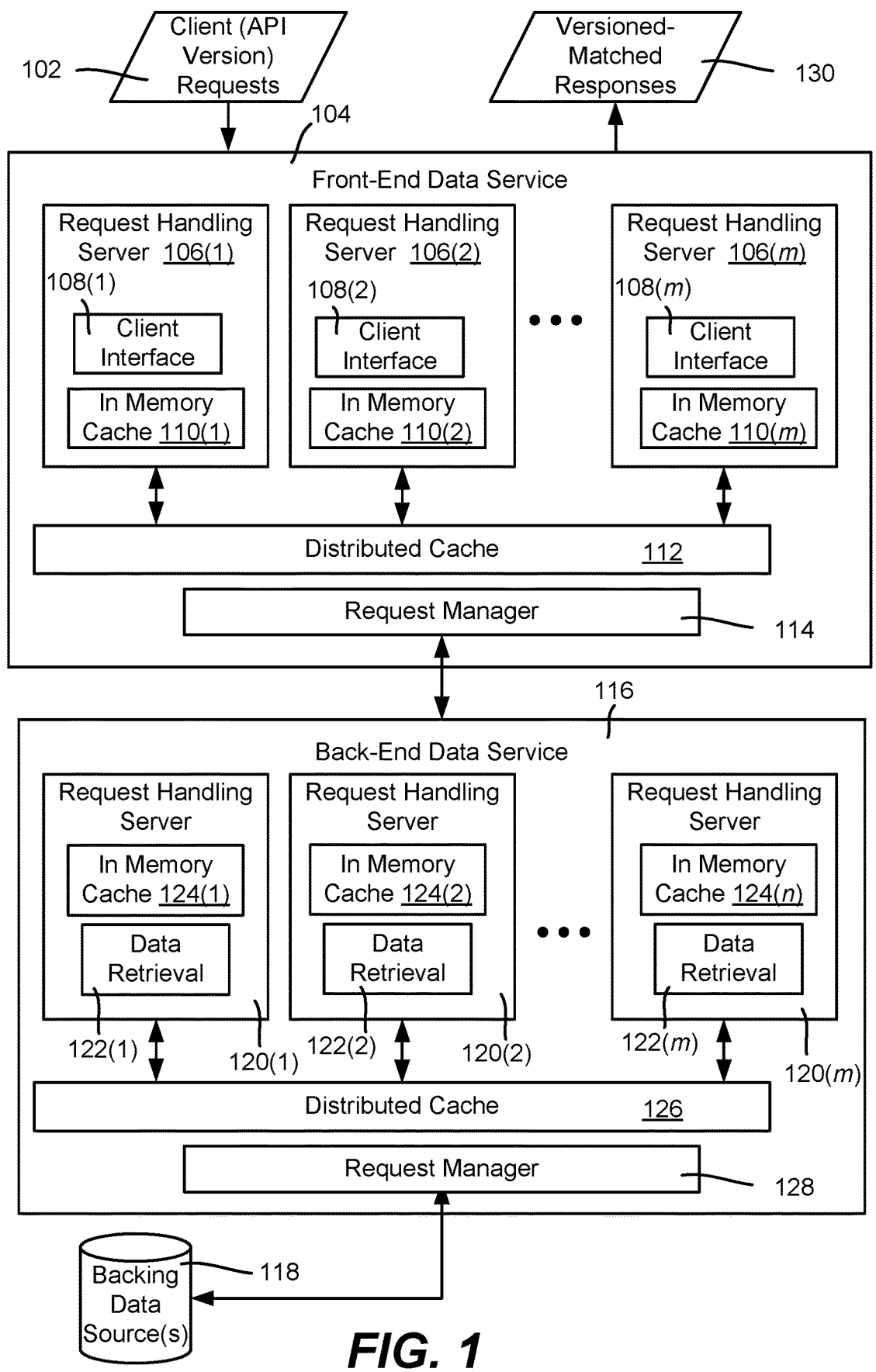
FIG. 1 is an example block diagram representation of components that handle requests for data to return version-matched responses, according to one or more example implementations.

Various aspects of the technology described herein are generally directed towards making software version management efficient and far less complex. In one implementation, version changes are made by straightforward changes to declarative data files, whereby new client versions can be introduced without changing the data service's (server) software code.

By way of example, if version 3.0 clients expect a data structure (e.g., graph node) having data properties [A, B, C], a declarative data file may be used to specify those data properties. A new version 4.0 may have a different declarative data file that specifies data properties [A, B, C, D]. As will be understood, without needing to change the server software code, version 4.0 clients obtain the graph node for version 4.0 with data properties [A, B, C, D], while version 3.0 clients obtain the graph node for version 3.0 with data properties [A, B, C].

In one or more aspects, to match the appropriate data structure(s) to a client based upon that client's version, described herein is maintaining the various software entities (including data structures, code sections, heuristic rules, data templates and/or data, for a requesting client (a requestor) in a hierarchy. In one or more implementations, the software entities are maintained as files, which is one type of data structure, however it is understood that the software entities are not limited to any particular form. Indeed, while the information may be hierarchically maintained in any suitable hierarchy including a hierarchy of data structures, the data structures are generally exemplified herein as files, whereby the technology is able to leverage any suitable existing hierarchical file system. Thus files are generally described herein, although it is understood that this not a limitation and is only for simplifying explanations and examples.

The files may be arranged in a general format that applies to various client-specific information, including device classes, device types and/or software program versions. Any time a software file is to be used with a client, client-specific information (e.g., within an authorization/access token, or alternatively within information contained within a User-Agent HTTP request header) sent with the client request is used to select the relevant set of files for the requesting entity, that is, the client-specific information is used to determine the set of files that applies to a given client. Thus, for example, a smartphone running version 3.0 smartphone client code has an associated set of files that is likely different from the set of files for that same smartphone running version 4.0 client code; a personal computer running version 3.0 PC client code has an associated set of files that is likely different from the set of files relative to the smartphone running version 3.0 smartphone client code, and so on.

It should be noted that the set of resource files that apply to a given client via its client-specific information are not necessarily returned to the requesting client. For example, given a set of generic data, a resource or resources may comprise one or more template files that format and shape the generic data into data appropriately customized for the client; the appropriate set of template file(s) for a given client based upon the client's client-specific information are selected and used by the data service in one or more implementations. Similarly, another resource may comprise expansion rule files; expansion rule files specify to the data service how to expand a client request for one data item (e.g., a graph node) into an expanded request for other (e.g., likely next-wanted) data items. Such resource files that instruct the data service how to expand a response may be specific and applied to the client version by the data service, but are not themselves returned to the client; instead, the expanded data set is returned. Notwithstanding, other version-specific files such as graph nodes representing navigation menus, and static user interface components (e.g., tiles) may be returned to the client.

To obtain an appropriate resource/file set for a given client, one or more aspects are directed towards maintaining resources as current files and override files (whether entire files or files containing deltas relative to another file) and selecting a set of relevant files (e.g., a mix of current files and override files) based upon a client version. Non-limiting examples of such resources include navigation menu files (menus having interactive components that link to other navigation menus), template files (that shape and format response data as expected by a client version), expansion rule files (that expand a data item request into a request for one or more additional data items), static tiles (that are not retrieved from the back-end data service), and any other versioned resources such as filtering specifications (that filter data before returning), and so on. Note that executable code also may be a version-specific resource; (although it is desirous to maintain only one code set and use templates and the like to support multiple versions of the API, there are situations in which multiple code sets may be unavoidable); the same declarative mechanism can be used for code override.

As will be understood, the use of hierarchically-arranged resources as described herein provides a highly efficient way to process and/or return data for each client request based upon client-specific information. Further, the use of hierarchically-arranged resources avoids reprogramming the client request handling server code, e.g., every time a new device is introduced and/or a new version of client software is released. Instead, one or more corresponding resources are inserted into the hierarchy to support any such change, and the client request handling server code automatically starts using the new resource or resources. A resource also may be replaced in the hierarchy with an updated one, such as if the resource being replaced contained an error, and resources may be removed from the hierarchy, such as when a device/software version is no longer supported. As will be understood, resources also may be moved within the hierarchy; for example, a version 3.0 resource that is unchanged when version 4.0 is released may be moved from the version 3.0 sub-hierarchy to the version 4.0 sub-hierarchy.

It should be understood that any of the examples herein are non-limiting. For instance, some of the examples refer to a data service associated with video streaming that returns video data, and also returns catalog items, such as built from various data sources to represent television content such as movies or shows via nodes in a client graph. However, the technology described herein is independent of any particular type of data being returned. Further, the technology described herein is exemplified with respect to a data service having a front-end/client facing portion and a back-end service portion that obtains and returns data to the data retrieval service as needed; however, this is only one implementation, and a single data service that operates to respond to client requests without a separate front end and back end portions may benefit from the technology described herein. As another example, a file system is used as the hierarchy in one or more implementations, but any mechanism that can relate client request information into resource references (e.g., a database) may be used in alternative implementations.

Still further, as used herein, a "client" may be any requesting entity, not necessarily a remote client device/ software that makes request to a data service. Indeed, as one example of another type of client, the data service front-end may be a client of the data service back end. As a result, versioning as described herein may be implemented at this lower data service level, e.g., one front-end server may be a version 2.0 client of the back-end data service, while another front-end server may be a version 3.0 client of the back-end data service.

As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data retrieval/ processing in general.

FIG. 1 is a block diagram representing example components that may be used to provide and work in conjunction with data requests as described herein. In FIG. 1, client requests 102 are received at a (e.g., front-end) data service 104. One such data service 104 comprises a cluster of generally load-balanced request handling server machines 106(1)-106(m), where m represents any practical number of server (virtual and/or physical) machines.

In one or more implementations, for handling client requests, the load-balanced server machines 106(1)-106(m) each have a client interface 108(1)-108(m), respectively. Some client data requests may be satisfied by data from a front-end in-memory cache, 110(1)-110(m), respectively. Also shown in FIG. 1 is a distributed cache 112, e.g., a REDIS cache shared among the request handling servers 106(1)-106(m) that also maintains data for responding to client requests. In a typical implementation, the distributed cache 112 is larger than the individual in-memory caches 110(1)-110(m), and has a higher hit rate; however the distributed cache 112 takes longer to access, e.g., needing a network request and response. Those client data requests that cannot be satisfied by front-end cached data are sent by a front-end request manager 114 to a back-end data service 116 over a suitable network connection or the like.

In one or more example implementations, the data item requests may correspond to nodes of a client user interface graph, (with the nodes sometimes referred to as providers). The client graph thus has nodes representing user interface objects such as menus, tiles, buttons, icons and so forth, with relationships between the nodes based upon references (edges) to other graph nodes.

Further shown in FIG. 1 is a back-end data service 116 that is coupled to one or more backing data sources 118. In one or more implementations, the back-end data service 116 comprises a cluster of generally load-balanced server machines 120(1)-120(n), where n represents any practical number of such server (virtual and/or physical) machines. In FIG. 1, the exemplified load-balanced data server machines 120(1)-120(m) each have a data retrieval component 122 (1)-122(n), and an in-memory cache 124(1)-124(n). A back-end distributed cache 126 likewise is typically provided.

For requests that reach the back-end data service 116 but cannot be satisfied from any back-end cache, the back-end data service 116 is further coupled (e.g., via an intranet and/or the internet 120) to send requests for data to the one or more various backing data sources 118. Non-limiting examples of such data sources 118 may include key-value stores, relational databases, file servers, and so on that may maintain the data in virtually any suitable format. A client request for data (e.g., a graph node) may correspond to multiple sub-requests (for different parts of the graph node), and these may be to one or more of the backing data sources 118. Moreover, one data store's data may override another data store's data; e.g., the data for a television show may include a generic image URL obtained from one data store, however an "editorial"-like data store may override the generic image with a different image, such as for some uncharacteristic episode.

Whether via cached data or via the backing data sources, version-matched responses 130 to the client requests 102 are returned to each requesting client entity. Described herein is using versioning of resources so that each requesting client entity receives the data in a way that each requesting entity expects and/or is suitable for the client version.

Figure 2:
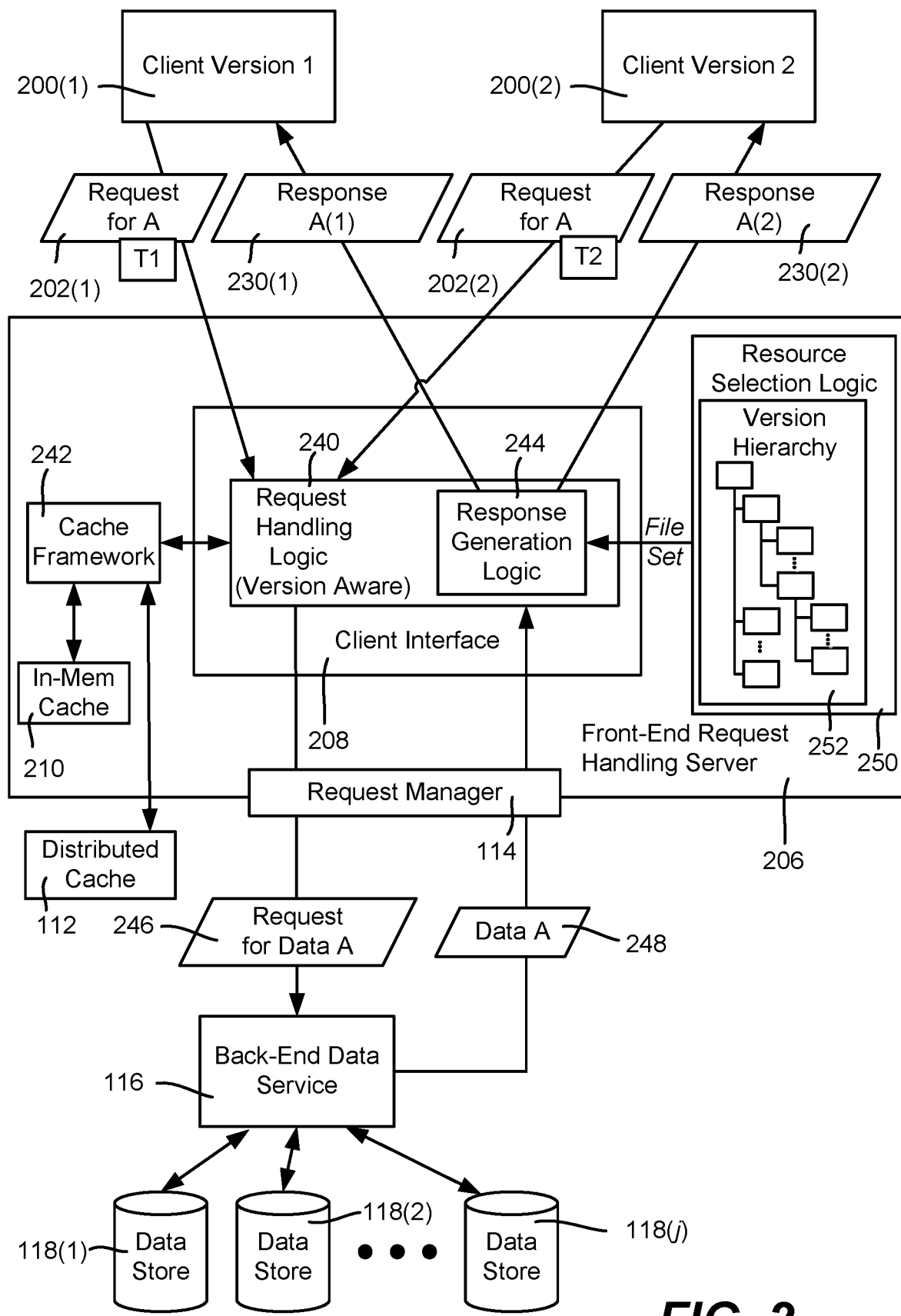
FIG. 2 is an example block diagram representation of components that use different versions to return version-appropriate responses based upon different requesting clients, according to one or more example implementations.

FIG. 2 shows additional details of a front-end request handling server 206 in one or more example implementations. A client device 1 labeled 200(1) and a client device 2 labeled 200(2) send data requests 202(1) and 202(2), respectively, for data corresponding to data item A, where "A" represents some service-unique identifier as described herein, such as a uniform resource name URN. The requests 202(1) and 202(2) may be sent at the same time or at different times. Each request 202(1) and 202(2) is associated with an authorization/access token or the like, T1 and T2, respectively, that provides client-specific information regarding the requesting entity, such as the device type (e.g., tablet, smartphone, entertainment and gaming console, personal computer browser, internet television device and so on, which may include being identified by device model and vendor), as well as software version information regarding the client software platform that is making the request.

Request handling logic 240 of the client interface 208 receives the requests 202(1) and 202(2). In one or more example implementations, to check for cached data, the request handling logic 240 communicates with a cache framework 242 (e.g., an instantiated library), which handles cache read-through and write-through operations. If the requested data item's data (e.g., for data item A) is cached and not expired, response generation logic 244 processes the data (if needed) for returning appropriate responses 230(1) and 230(2) to the requesting clients 202(1) and 202(2), respectively. The response generation logic 244 is coupled to the request handling logic 240/client interface 208, e.g., whether as a separate component or a component incorporated into the request hander logic 240.

Note that in one or more implementations, (like the resource selection logic 250 described below), the request handling logic 240 is also version aware. Indeed, the request handling logic 240 may include one or more sections of code that may be different for different API versions, for example.

For a data item request that does not have valid front-end cached data, the request manager 114 makes a request 246 for the data to the back end data service 116. The data may be cached at the back end data service 116, or if not, is obtained from one or more backing data stores 118(1)-118 (j). Note that the data for a data item A, such as a feature that represents a movie, may be composed from different parts, e.g., a movie title, a rating, a plot summary, a URL to a representative image and so on, (some of which may be overridden by an editorial data store or the like), and thus the back-end data service 116 may need to make separate requests to one or more of the backing data stores 118(1)-118(j).

If not cached at the front end, in a typical situation in which no errors occurred, whether obtained via a back-end cache or a backing data store or stores, the data for data item A 248 is returned from the back end data service 116. The data of the response 248 may be cached by the cache framework 242 (e.g., in both the in-memory cache 210 and the distributed cache 112), and is provided to the response generation logic 244. Note that FIG. 2 generally represents caching before versioning (e.g., to apply version-dependent templates) is applied; this may be one type of caching, however it is an alternative to cache the data after versioning (e.g., including templating) is applied, or to cache both data before versioning is applied and after versioning is applied.

As described herein, the response generation logic 244 is coupled to resource selection logic 250 that selects resources from a version hierarchy 252, e.g., comprising a set of one or more files from among a file hierarchy that is selected based upon the identified data item request and the client-specific information (e.g., including a version identifier in each client token T1 or T2 or otherwise associated with the request) to return a response 230(1) or 230(2) that is customized as needed for that client version. Thus, for example, if client device 200(1) and 200(2) differ with respect to the data format/shape they are each expecting, the response 230(1) that contains data item A's data differs in format and/or shape from the response 230(2) that also contains data item A's data.

As one example, consider a root navigation menu that in version 3.0 has an interactive component representing a "Kids" sub-menu, but in version 2.0 does not. A version 3.0 client gets the root navigation menu with an interactive link to the "Kids" sub-menu, but a version 2.0 client does not. As another example, consider that a request for data item X made by a version 3.0 client results in an expanded response that includes data items X, Y and Z, but for a version 4.0 client includes data items X and Y.

Figure 3:
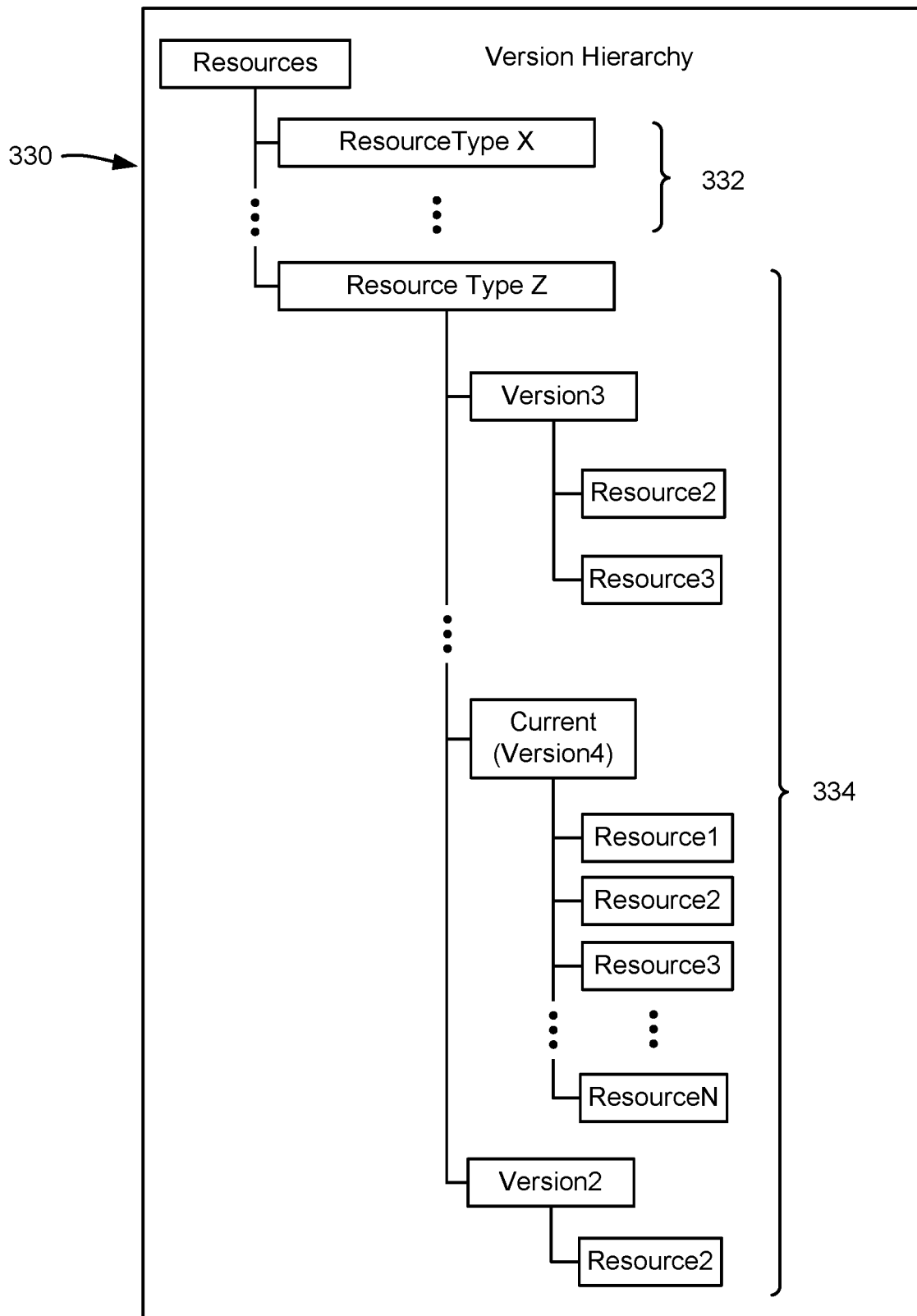
FIG. 3 is an example representation of a hierarchy of data files for resource types and versions, according to one or more example implementations.

FIG. 3 shows an example of a version hierarchy 330 for resource types divided into version based sub-hierarchies 332 and 334, (where, for example, one resource type's sub-hierarchy may contain templates, another resource type's sub-hierarchy may contain expansion rules, with another resource type's sub-hierarchy for storing navigation menus, and so on). Thus, in the example hierarchy 330 for FIG. 3 for a resource type of Z (e.g., template), a path may exist for template/version2/*.*, another path for template/current/*.* and another for template/version3/*.*.

As can be seen, by arranging the hierarchy 330 with the resources (e.g., files of a file system hierarchy of folders and files) and then following folder paths such as from any more-specific override file towards a least-specific file, the most-specific file that is available for the requesting client is matched to the client's version identifier that is received with the client request. This allows the straightforward addition of new files to the hierarchy as new versions are released, while allowing older existing files to override the new files if there are differences between the versions.

By way of example, consider that different version clients make requests that correspond to the files for resource type Z. Version 4.0 clients, which in this example is the current version, may have selected for them a set or subset of the resource files [Resource1, Resource2, Resource3 . . . ResourceN]; none of these files are overridden. In contrast, version 3.0 clients get the same file set or subset but possibly with some files overridden, namely the files Resource2 and Resource3 from the version 3 subfolder will override those that are in the version 4 subfolder. Note that different ways to override are feasible, including to search for the file first in the more specific subfolder (e.g., version 3.0) and select that file if it exists, otherwise continue to the next less specific subfolder, and so on (as exemplified in FIG. 6). An alternative way is to select the full set or subset of least specific files, and then replace each one with any more specific file that exists (as exemplified in FIGS. 7 and 8).

It should be noted that version-based sub-hierarchies may be combined with device types and device classes by having further having sub-hierarchy arrangements. For example, using a file system hierarchy of files and folders, a device class A folder may be a parent folder to version subfolders 1.0, 1.1, 2.0, 3.0 and so on, (e.g.: DevClassA/V1.0/filename1.ext, DevClassA/V1.0/filename2.ext, DevClassA/V1.1/filename1.ext, DevClassA/V1.1/filename2.ext, and so on). Alternatively, each version folder may be a parent folder to device class and/or device type subfolders, (e.g.: V1.0/DevClassA/filename1.ext, V1.0/Device120/filename1.ext, V1.1/DevClassA/filename1.ext, V1.1/Device120/filename1.ext, and so on). Note that other differentiation mechanisms corresponding to further sub-hierarchies are feasible, e.g., low bandwidth connection versus high bandwidth connection subfolders, low latency versus high latency subfolders and so on, such as to select different resource files based upon variable network conditions, and the like.

Figure 4:
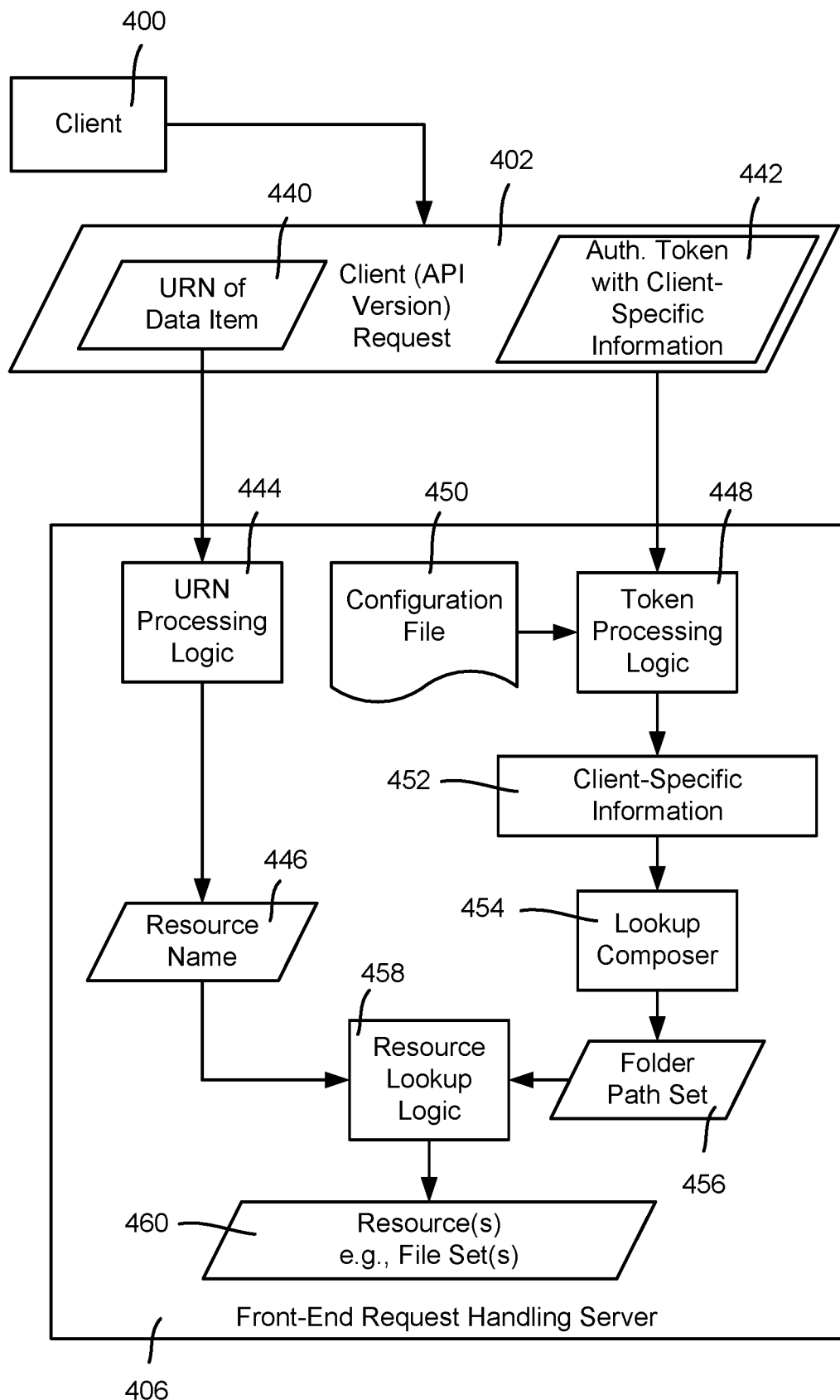
FIG. 4 is an example block and representation of how information associated with a client request may be used to select client-specific files, according to one or more example implementations.
Figure 5:
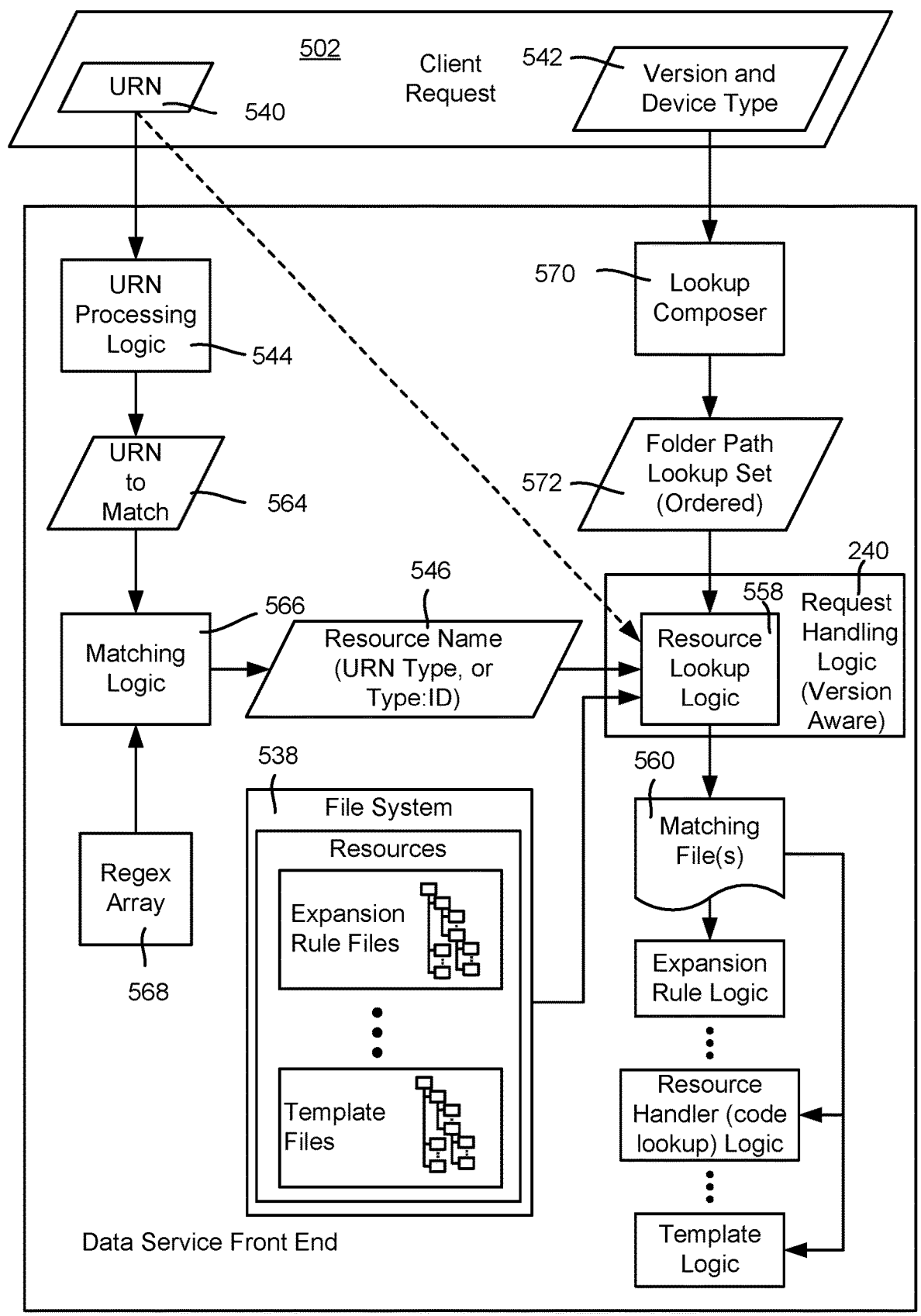
FIG. 5 is an example block diagram and representation of how information associated with a client request may be used to select a client-specific file set maintained in a file system hierarchy, according to one or more example implementations.

Turning to aspects related to resource selection, FIGS. 4 and 5 show one example implementation of how a request 402 from a client 400 is processed to determine which resource(s) to select. As described herein, client requests include an identifier of the desired data such as an object identifier (object ID), which may be in the form of a URN 440. A client request also includes a token 442, which among other purposes (e.g., authentication) may include client-specific information such as version information and a device code that indicates the type (e.g., the vendor and model as needed to differentiate from others) of the requesting client device. The software version may include the device code, or may be in another code (e.g., appended to a device-only code); for purposes of explanation, consider that as used herein, "client-specific information" identifies the software (e.g., API) version and/or any device type/device class information.

In general, URN processing logic 444 determines a resource name 446 from the URN, which may be a type:ID combination. For example, certain types of requests may be grouped together as a type of resource; e.g., for requests for a television "Series" type, a subset of the resource hierarchy may have resource resources named series, requests for a "Season" type may have resource resources named season, and so on. A more specific example of URN processing logic is described herein with reference to FIG. 5.

Along with processing the URN, token processing logic 448 uses information in a configuration file 450 to obtain client device-specific information 452 based upon the device code, e.g., device class, device type, and software version information. For example, each client's client specific information, via the configuration file 450 or the like on the front-end data service server 406, may be mapped to a device "class" comprising a category of devices that generally share the same design and thus tend to have the same data requirements, possibly with some device-specific exceptions. For example, a particular smartphone from the same vendor may have at least some of its models configured to run the same client platform software and thus expect the same form of each data item's data, as also matched to the client's software version.

Using this client device-specific information 452, a lookup composer 454 builds a set of paths to the resources in the hierarchy. If, for example, the resource hierarchy corresponds to a file system hierarchy, then the paths to the resources are in a set of folder paths 456. A more specific example of token processing logic 448 and corresponding resource selection is described herein with reference to FIG. 5.

In one or more example implementations, the set of folder paths are ordered so that more specific files override least specific, as described below. Resource lookup logic 458 uses the resource name 446 and the folder path set 456 to find the most specific resource 460 that applies to the request.

FIG. 5 shows an example of finding applicable resources for a client device and software version via a hierarchical file system 538, in which data items are identified and requested via a URN that is unique (at least within the data service). When a client request 502 is received, along with the provider URN ID(s) requested, the client information 542 (e.g., device type and software version) are also known to the data service front end server as described herein.

In one or more example implementations, URN processing logic 544 provides each client identified provider URN into each URN to match 564, and matching logic 566 accesses a set of regular expressions (e.g., arranged in a Regex array 568) to determine a resource name 546 (e.g., a string) corresponding to the type or type:ID that matches the regular expression derived from that URN 564. The resource 546, e.g., represented by the text of the string, is thus determined based upon the provider type or the provider type:ID.

In one or more implementations, the regular expressions are part of a configuration file comprising an array whose elements are a regular expression/rule (e.g., resource) name pair. For example:

```
// rules.json
{
    rules: [
        {
            name: "series",
            regex: "urn:hbo:series:([a-zA-Z0-9_\-])+"
        },
        {
            name: "navigation",
            regex: "urn:hbo:navigation-menu:([a-zA-Z0-9_\-])+"
        },
        // and so on ....
    ]
}
```

A configuration file is read in on service startup, and the regular expressions (with their rule name pairs) are compiled from the configuration file into the Regex array 568. In one or more implementations, this array 568 of regular expressions is then applied, in order, one-by-one via the matching logic 566, to the URN to match 564, and the first regular expression that matches is considered the matching resource; (note that because more than one can match, order matters and thus the array is ordered more specific to less specific, in general). The name of this resource is returned from the matching engine and is used in resource lookup.

For example, for a series type URN, (e.g., "urn:hbo:series:gameofthrones") the selected resource filename may be based only on the type, such as "series.hbs" or the like corresponding to the resource name string "series" matched by the matched by the matching logic 566. Overrides/more particular files relative to the type may be made by having the regular expression array have a matching type and ID. For example, a URN such as "urn:hbo:navigation:FAQ" may have an entry in the regular expression array 568 such that the matching logic 566 matches the type (navigation) and ID (FAQ), with a string such as "navigation.FAQ" such that the resource lookup logic 558 (e.g., within the request handling logic 240) looks for an resource file named "navigation.FAQ.hbs" or the like.

It should be noted that in a more simplified system, e.g., in which there only relatively a few data items rather than thousands of nodes of different types, the data item IDs may be more directly used, (e.g., as represented in FIG. 5 by the dashed arrow). For example, if only dozens of data items had to be dealt with for resource selection, then each data item ID (or unique portion thereof) may be used as is the "resource name" for resource lookup, e.g., without regular expression matching and so on, as described herein.

For matching the rule name 546 (e.g., derived from the URN) to a client-specific information 542 (e.g., client device and/or software version), which in this example implementation has one or more associated resource files, the file system hierarchy is leveraged. More particularly, based upon the version and device type data 542, a lookup composer 570 builds (or retrieves from a cache if previously built) a set of file system folder paths 572 for this version and device type, in which the paths are ordered so that more specific overrides less specific resource files.

For example, a folder path lookup path may include something such as [" . . . \resource\resources\v3\deviceA\series.hbs" and " . . . \resource\resources \v3\default\series.hbs"]. Note that the file system folders and files may be maintained in relatively fast memory, e.g., RAM, whereby retrieval of the file is extremely rapid.

In this example, within the file system, a resource file may exist that corresponds to the type or type:ID for the data item's URN as exemplified above. If a specific resource file exists, that resource file is used, otherwise a less specific (e.g., the default) resource file is used. For example, for version v3 of a device A, a specific device A series resource file may be found and used, whereas for version v3 of a device B, no specific resource file is found, and thus the default resource file is used. In one or more implementations, such a default resource file always is present in the hierarchy (or this situation is an error). The current version folder may be the default folder.

To summarize resources and resource loading, including customizing output for specific devices, in one or more implementations, when a client makes an authorized request to a client-specific service, the client provides an authorization token that contains client-specific information, such as a version and a device code. This client-specific information is used in part, along with the data item or data item type, to locate one or more resources that determine what the client receives in response to a request as described herein.

As can be readily appreciated, there are various ways in which to select one file over another based upon versioning information. If a single resource file (or other relatively small number of resource files) is being sought for a request, then it is efficient to look for that file or file set in folder paths arranged from most specific to least specific, and return the first file found.

Figure 6:
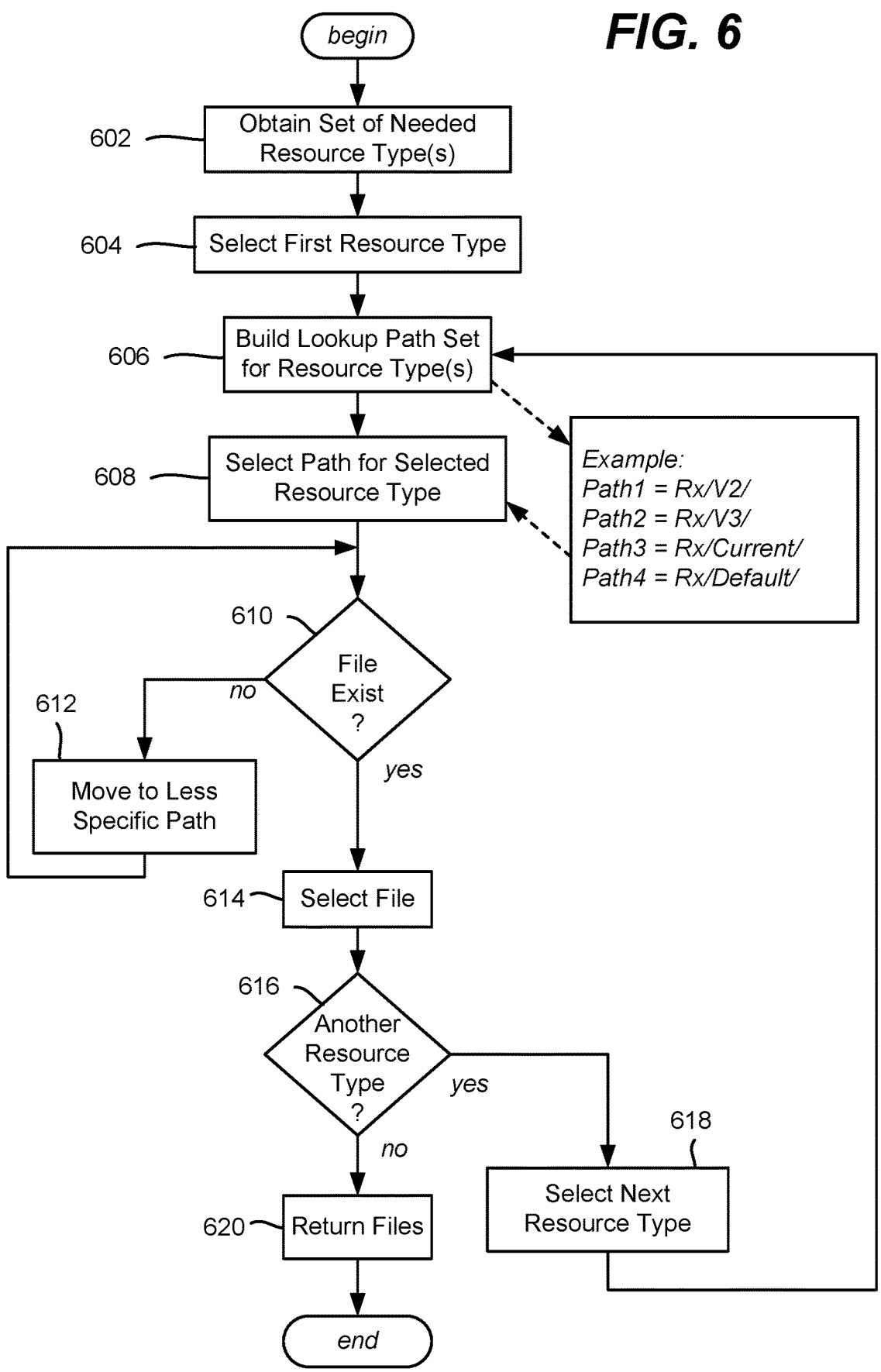
FIG. 6 is a flow diagram showing example logic/steps that may be taken to select files based upon a client's version information by traversing a file system hierarchy as needed from a most specific folder path to a least specific folder path, according to one or more example implementations.

FIG. 6 shows an example of seeking a file for each resource type. For purposes of explanation, only a version differentiation is used in FIG. 6 as client specific information, although it is understood that device type or device class along with version information may be used to locate a file, by having device/device class subfolders and building the additional information into the pathnames.

Step 602 represents obtaining the set of resources for which a file is desired for each, e.g., a template file and an expansion file for a version 2 (V2) client. Step 604 represents selecting the first resource type, e.g., resource type template, with step 604 building the paths from most specific to least specific (Rx/V2/filename.ext, Rx/V3/filename.ext, Rx/Current/filename.ext, Rx/Default/filename.ext, where "Rx" represents the resource type's actual subfolder name, e.g., "/Templates" for now. Step 608 chooses the most specific folder path in the lookup set, e.g., Rx/V2.

Step 610 evaluates whether the file exists in the selected folder path; if so, that file is selected for use (step 614). Otherwise, step 612 changes to the next most specific folder path, e.g., Rx/V3, to again look for the filename for the file being sought.

In one implementation, a default subfolder contains some version of the requested file, whereby at least one file is found that satisfies the lookup. Note that the current folder may be the default folder, although in other implementations these may be different folders.

Steps 616 and 618 repeat the process for the next resource type, e.g., this time/Rx represents "/ExpansionRules" or some other appropriate subfolder name. As many resource types as needed for a request may be used in this manner. When the files have been located for each resource type, step 620 returns the file set to the appropriate entity, e.g., the response generation logic 244 of FIG. 2. These files may contain the requested data and any expanded data, as well as the template used to format and shape that data based upon the client-specific information.

Figure 7:
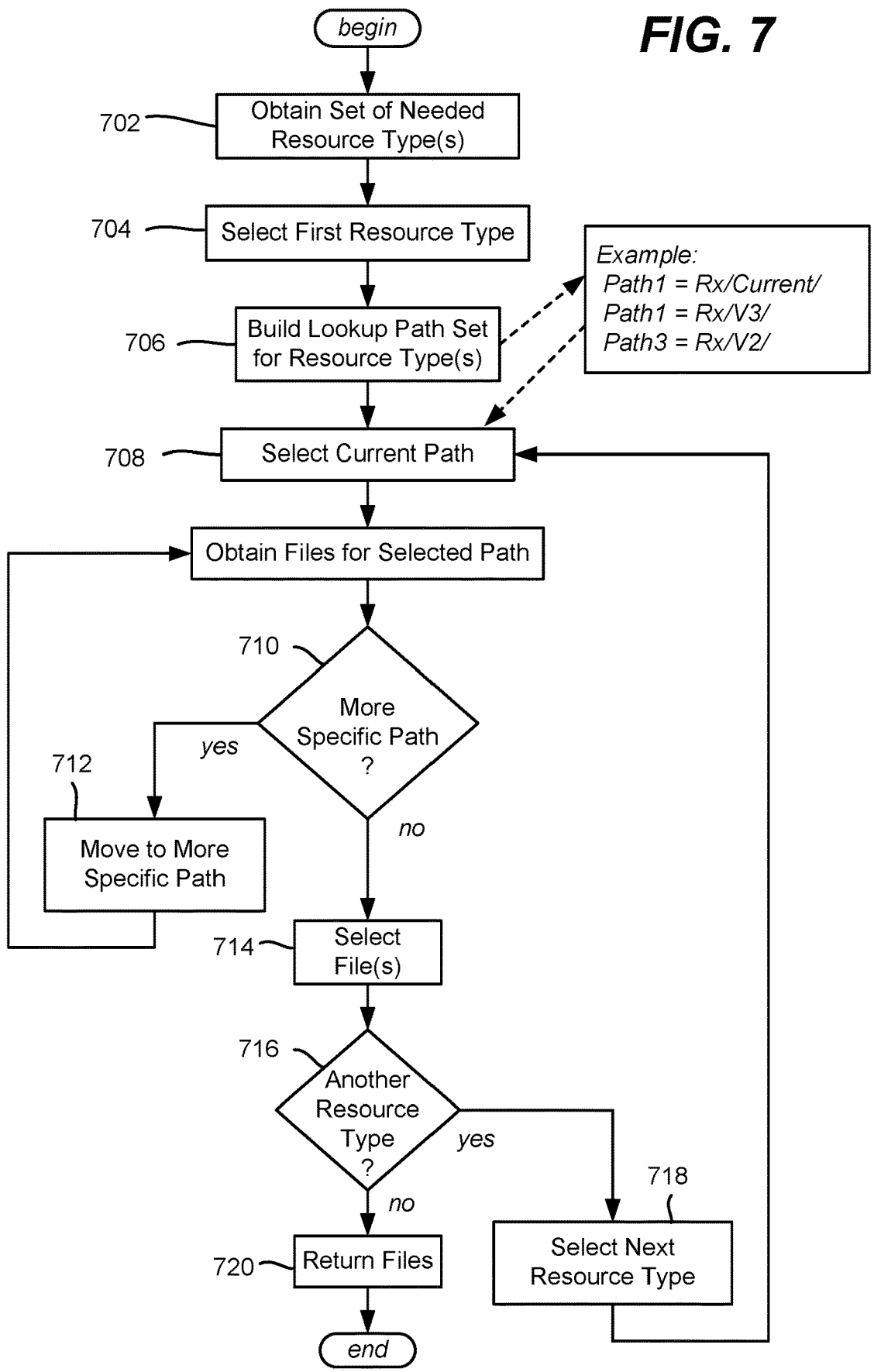
FIG. 7 is a flow diagram showing example logic/steps that may be taken to select a file based upon a client's version information, by traversing a file system hierarchy from a least specific folder path and replacing files as needed from a more specific folder path, according to one or more example implementations.
Figure 8:
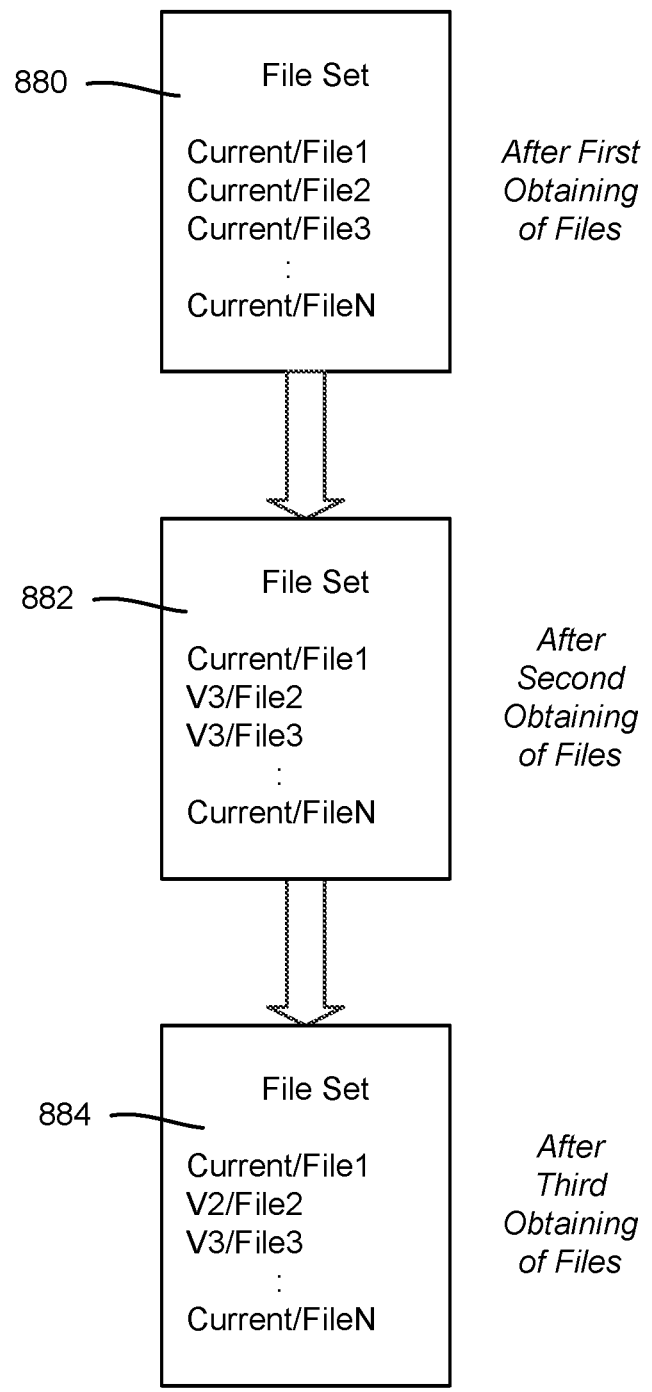
FIG. 8 is a block diagram showing how a file set changes by replacing files to match a client version, according to one or more example implementations.

FIGS. 7 and 8 show another way to retrieve needed files, which may be more efficient if a relatively larger number of multiple files (e.g., File1-FileN) are to be returned for the same resource from the set of folders. In FIG. 7 Step 702 represents obtaining the set of resources for which one or more files are desired for each, e.g., a set of navigation menus and a set of static tiles.

Step 704 represents building the paths from, in this example in the opposite order relative to FIG. 6, from least specific to most specific (Rx/Current/, Rx/V3/, Rx/V2/, where "Rx" represents the resource type's actual subfolder name, e.g., "/NavigationMenus" for now). Step 708 chooses the least specific folder path in the lookup set, e.g., Rx/Current, which contains the current version for each of the multiple files.

Step 710 selects all of the files in the selected folder path, File1-FileN in this example. The set of files at this state is shown at block 880 of FIG. 8. If a more specific path exists then step 710 repeats the process for the next most specific path. For example, if the current version is V4 and the client is V2, then a V3 folder path is next searched, followed by a V2 folder path. Note that there may not be a folder path, e.g., there may be a current (V4) path, but no V3 path; it is also feasible for there to be a V3 folder path with no files therein.

In this example, the client is a V2 version client, and thus step 712 changes to the V3 path to look for any more specific file or files to override those from the current V4 folder. In this example, the V3 folder contains an override file for File2 and File3, which replace those in the file set, as shown in FIG. 8 via the file set labeled 882 in this state. If the client was a V3 client, then the file set 822 shown at this state is returned; however in this example, the client is a V2 client, and thus the override process continues by searching the V2 folder path.

In the V2 folder path, File2 overrides the previously found version, resulting in the file set 884 shown at this final state for a V2 client. Thus, in the incremental override model, a current resources subfolder has the complete set of files needed for a resource type, with the file(s) in the resources subfolder(s) for any older version(s) used to incrementally replace those in the complete file set until the path corresponding to the client version is reached.

Whether building the file set from most specific to least specific (as exemplified in FIG. 6), or replacing less specific files with more specific files in the file set (as exemplified in FIGS. 7 and 8), a significant advantage is that only the older version files that need to be maintained are actually maintained. For example, if some version 3.0 file X is unchanged in version 4.0, then the version 3.0 file is moved to the version 4.0 subfolder, as this file instance applies to both version 4.0 and version 3.0 clients (and possibly version 2.0 clients and version 1.0 clients). Only if there is a difference between files, e.g., the version 2.0 and version 4.0 for this file differ, does the earlier file need to be maintained in its version-specific subfolder.

It should be noted that various ways to respond to client requests for unknown or unsupported versions may be used. For example, for a no-longer supported version, the request may be responded to with an error code response that corresponds to instructing the client to upgrade to a more recent version. For example, one way to achieve this is to explicitly mark the version as discontinued and return a 400 or 410 HTTP response with an appropriate information to the client. This, for example, may be done by the token processing logic 448 (FIG. 4) or some other entity, to avoid unnecessary processing. A whitelist or the like of supported versions may be maintained. Also, some truncation or the like may be used; e.g., a version 2.5 client may be considered a version 2.0 client if no files exist between version 2.0 and version 3.0 (such as if versions between 2.0 and 3.0 fixed bugs but did not correspond to any resource file changes).

Figure 9:
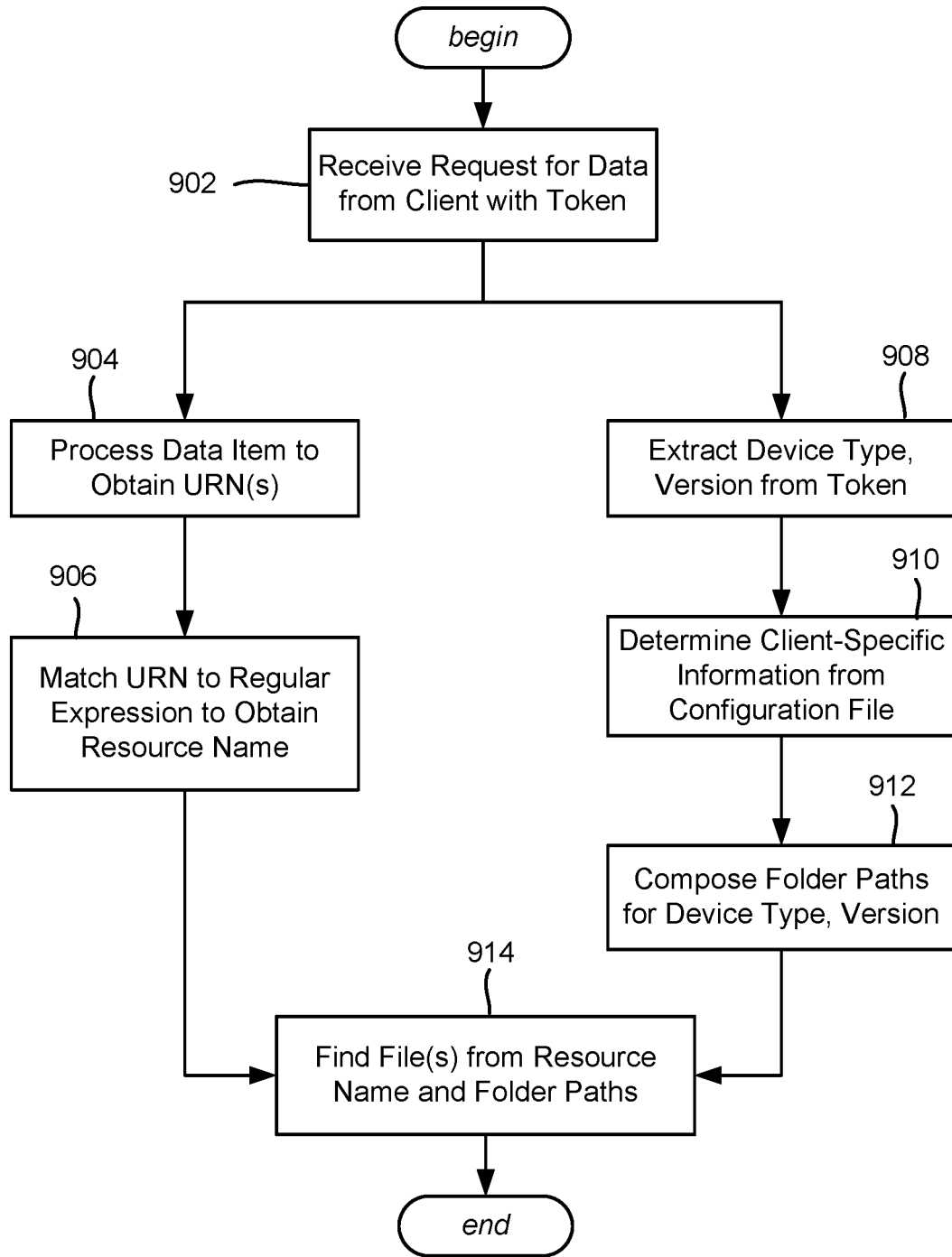
FIG. 9 is a flow diagram showing example logic/steps that may be taken to select a version-specific file set to provide a client-specific response, based upon a request for one or more data items and client-specific information, according to one or more example implementations.

FIG. 9 is a flow diagram showing example steps that may be taken in one or more implementations when a request for data is received at a front-end data service, as represented by step 902. Step 904 (if needed) represents processing the client request into its identifiers (URNs), which for each URN step 906 matches the data item identifier URN against the regular expression array to find a resource (rule) name. As described above, the resource/rule name corresponds to the filename; e.g., the resource name for an episode type URN may be the string "episode" with the appropriate extension appended for episode template files.

Step 908 represents extracting the device and software version information from the token, which step 910 processes into the client-specific information. Step 912 composes the ordered set of folder paths based upon the client-specific information, e.g., device class, device type and/or software version. With the resource name and folder paths, the desired file is located at step 914.

It should be noted that the two exemplified branches of FIG. 9 may have their steps performed at generally the same time. In a parallel system, these operations may occur at basically the same time, with step 914 awaiting both results. Note however that as described above, steps 902 and 908 may be performed before any other example steps, along with some additional straightforward operations, such as to verify that the client version is that of a supported, valid version and so on.

Turning to another aspect, a delta file mechanism is also feasible, in which an override file (older version) contains changes relative to a selected file (newer version), and/or a selected file (newer version) contains changes relative to an older version. The changes may be to delete data, add data and/or change data.

By way of example, consider that FileX version 2.0 having (e.g., declarative) data properties [A, B, C] is changed in version 3.0 to have data properties [A, B, C, D]. As is understood, one implementation is to have version 2.0 contain a delta file relative to the "source" version 3.0 FileX, with an instruction "Delete D." An alternative is to have version 3.0 contain an instruction "Add D" relative to the source version 2.0 FileX. Deltas may be applied to a file after one or more other delta files are applied, e.g., a version 4.0 delta file may contains the delta(s) relative to a version 3.0 file, which itself is a delta file relative to the source file version 2.0. As long as the source file is found and the deltas are applied in the correct order, the appropriate data (or a data structure built on demand to contain the appropriate data) is returned.

Figure 10:
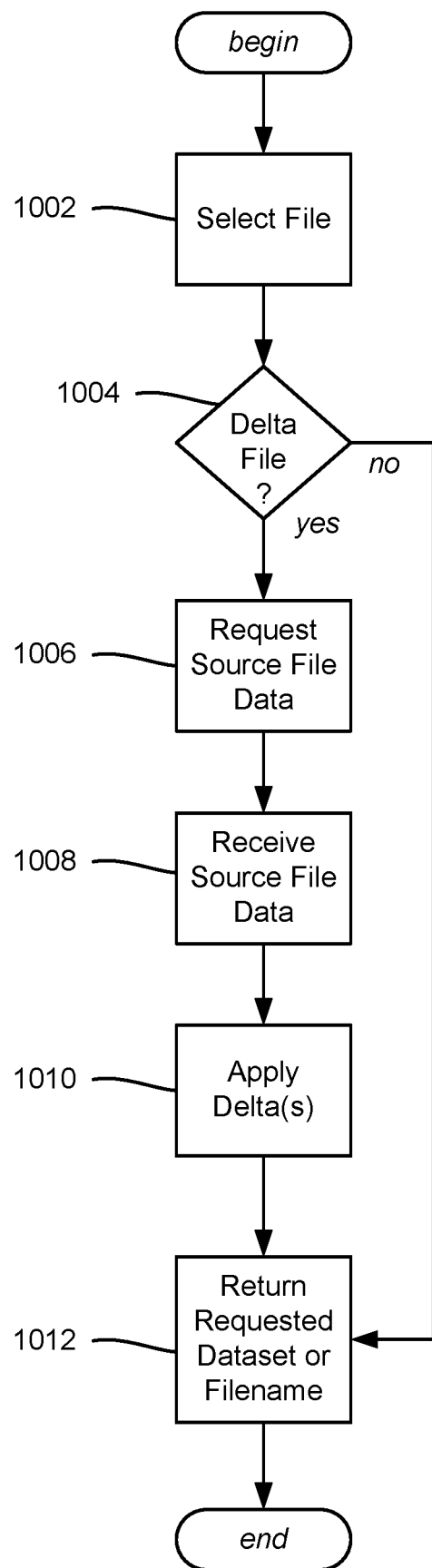
FIG. 10 is a flow diagram showing example logic/steps that may be taken to return requested data (e.g., a file set), including when a delta (change) file relative to a source file may be present, according to one or more example implementations.

Logic such as in FIG. 10, which for example, may be incorporated into or coupled to the resource selection logic 250 (FIG. 2), may be configured to apply deltas when appropriate and return a data set (or a filename of a file containing that data set) when a file is selected at step 1002 (e.g., corresponding to step 614 of FIG. 6 or step 714 of FIG. 7). Step 1004 evaluates whether the file is a delta file. Note that this may be by filename convention, e.g., FileX.delta.ext, or by opening the file and detecting some metadata therein that indicates the file is a delta file relative to another file. If not a delta file, step 1004 branches to step 1012 to return the dataset (or if returning the filename instead of the file contents, a reference to the file) to the requesting entity.

If a delta file, step 1006 is performed, which represents requesting the source file data, e.g., by requesting the next earlier version (if as in this example the delta file is relative to the earlier version) or next later version (if the delta file is relative to the later version). Note that step 1006 knows the path to the next earlier version in this example.

Step 1008 represents receiving the source file data, whether directly from the previous version or after any previous version's delta file(s) have been cumulatively applied to build the source file data. Step 1010 applies the deltas, resulting in the requested full dataset corresponding to the file contents. Note that if the requesting entity is requesting a file reference rather than the data contents, a resulting filename may be returned that corresponds to the source file plus each applied delta file. Further note that FIG. 10 may be recursive, in that if the next earlier version is also a delta file, that next earlier version requests its source file data (and so on, until the underlying source file is found).

While delta files may add some complexity in the retrieval and data building aspects, delta files may be easier for developers in certain circumstances, e.g., simply add a change file to a folder. Further, delta files may save significant storage space, as if a large file is used, rather than replicate that large file in each version folder, only the source file need be maintained along with relatively small delta files.

Moreover, the deltas (e.g., from the declarative hierarchical data structures) may be used as "What's new" API documentation. With this scheme, the API documentation will never get out of synchronization with the rest of the software entity versions.

In sum, client software versions change over time. As can be seen, these different versions may be supported by different (e.g., declarative) data structures accessed by the data service or the like to which clients make calls. By hierarchically arranging the data structures and having each client provide its client-specific information, an appropriate set of data structures (e.g., a file set of a file system hierarchy) may be selected for each client. Versioning (which may include device-specific or device-class-specific information) to meet client needs is thus handled in many instances without needing software changes at the data service.

One or more aspects are directed towards maintaining a hierarchy of software entities, including different sub-hierarchies corresponding to different versions of at least some of the software entities. Aspects include receiving from a requestor a version identifier and a request for a software entity set comprising one or more software entities corresponding to that version identifier, accessing the hierarchy of software entities to select a version-based software entity set selected at least in part via the version identifier; and returning information corresponding to the selected software entity set to the requestor.

Maintaining the hierarchy of software entities may comprise maintaining a hierarchy of data structures, code sections, heuristic rules, data templates and/or data. Maintaining the hierarchy of software entities may comprise maintaining a file system of files, each file corresponding to a software entity. Maintaining the hierarchy of software entities may comprise maintaining at least one software entity containing change data relative to at least one source software entity; this change data may comprise hierarchical software entities used for API documentation.

Accessing the hierarchy of software entities may comprise building a path order in the hierarchy ordered to correspond to a most-specific version to a least-specific version, and searching via the path order until a software entity is found. Accessing the hierarchy of software entities may comprise building a path order in the hierarchy ordered to correspond to a least-specific version to a most-specific version, selecting one or more software entities from the least specific version into a selected set, and replacing any software entity in the selected set having a version that is more specific than the version in the selected set.

Aspects may include receiving a type of a requested data item as part of the request for the software entity set, and selecting at least one software entity based at least in part upon the type of the data item. This may further comprise determining the type of the data item by matching an identifier of the data item to a regular expression.

The software entity set may be associated with a token, and the version identifier may be obtained based upon information in the token. Accessing the hierarchy of software entities to select a version-based software entity set selected at least in part via the version identifier may comprise using a version identifier and device type or device class information.

Returning the information corresponding to the selected software entity set to the requestor may comprise returning one software entity from one sub-hierarchy corresponding to one version, and returning another software entity from another sub-hierarchy corresponding to another version. Returning the information corresponding to the selected software entity set to the requestor may comprise returning information to the requestor indicating that the selected software entity set is no longer supported.

One or more aspects are directed towards request handling logic of a data service, the request handling logic configured to receive a client request for a requested data item, in which the request is associated with a client version identifier. Described herein is a hierarchy of resource files, in which the resource files are arranged in version-based sub-hierarchies, and resource selection logic coupled to the request handling logic, the resource selection logic configured to access the hierarchy to obtain a resource set comprising one or more resources that correspond to the requested data item and the version identifier. Response generation logic is coupled to the resource selection logic to use the resource set to generate a response that includes data of the requested data item, and the request handling logic returns the response in response to the client request.

The resource set may include a declarative file. The resource set may include a template file, wherein the response generation logic uses the template file to format and/or shape the data of the requested data item to match the client's software version. The resource set may include a version-based expansion rule file, wherein the response generation logic uses the expansion rule file to return with the response at least one additional data item based at least in part on the client's software version. The response generation logic may use a selected file from the resource set to generate a response that includes at least part of the selected file's data.

The request handling logic, resource selection logic, and response generation logic may be maintained as part of a multiple version-aware front-end data service that communicates with a back-end data service, and/or as part of a multiple version back-end data service that communicates with a front-end data service.

A file in the hierarchy of resource files may include a delta file containing change information of one version relative to a source file of another version; logic may apply data of the delta file to data of the source file to provide a resource of the resource set.

One or more aspects are directed towards receiving a client request for a requested data item, in which the client request is associated with a client version identifier, and selecting a resource set from a hierarchy of resource data structures, in which the resource data structures are arranged in version-based sub-hierarchies. Further described herein is using the resource set to process the data item and/or to obtain data for the data item into a versioned response corresponding to the client version identifier, and returning the versioned response in response to the client request.

Selecting the resource set from a hierarchy of resource data structures may include selecting a more-specific version of a resource data structure over a less-specific version of the resource data structure based upon the client version identifier.

The hierarchy of resource data structures may include folders, subfolders and files, and selecting the resource set may include selecting a desired file by searching in a search order from a more-specific version subfolder towards a less-specific version subfolder until the desired file is found.

Using the resource set to process the data item and/or to obtain data for the data item may include at least one of: locating a data item, applying a template to shape and/or format data of a data item, expanding a request for a data item to obtain at least one other data item, or filtering data.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Servers including physical and/or virtual machines are likewise suitable devices. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
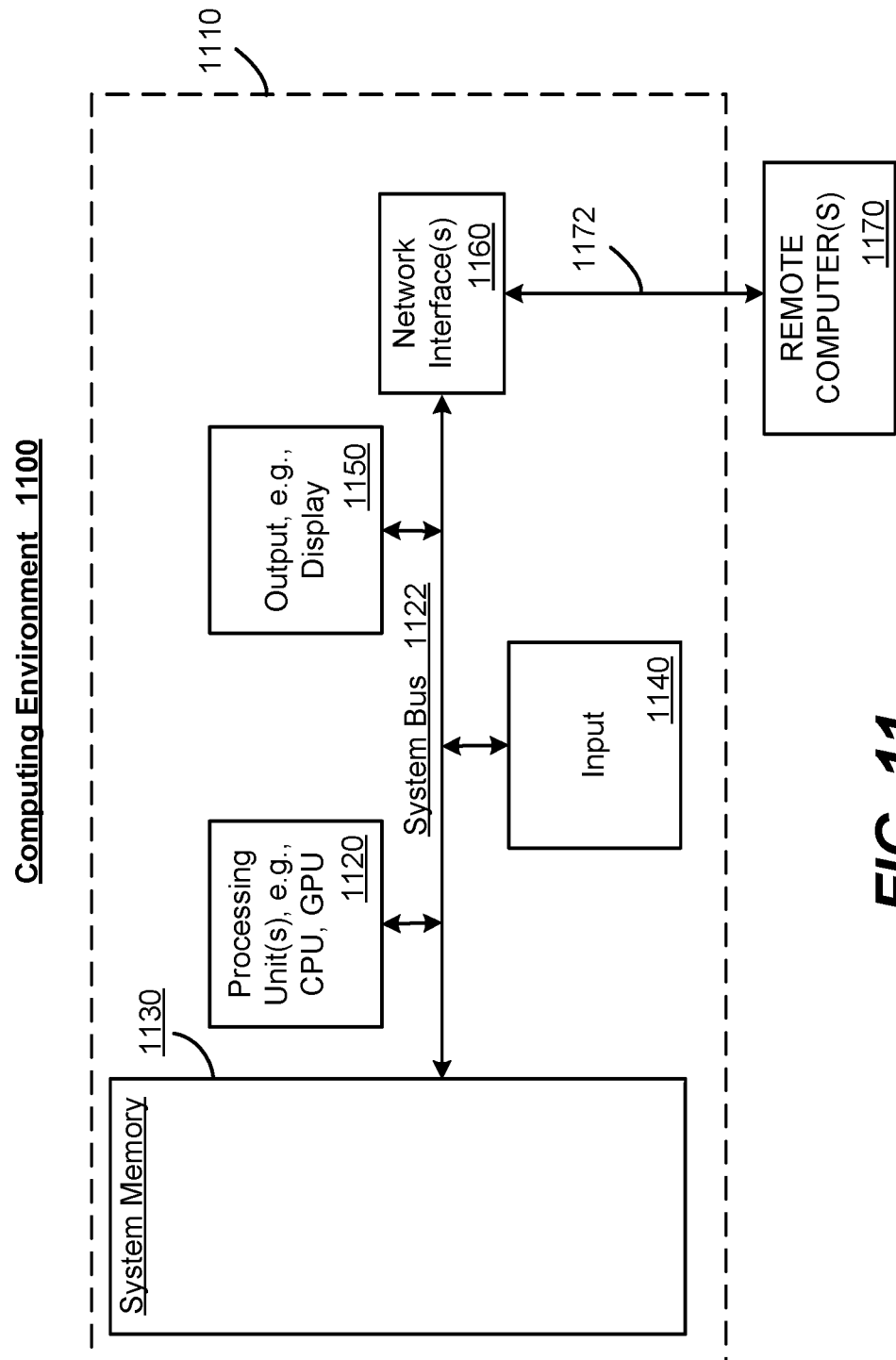
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/ buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that sources executable instructions which, when executed by the processor of the system, facilitate performance of operations, the operations comprising:
receiving a request for a data item, the request comprising a data item identifier and associated software version information;
selecting a selected software entity set, based on a software version identifier corresponding to the software version information, from a hierarchy of software entities;
obtaining data item content for the data item based on the data item identifier, wherein the data item content is a generic data item content not customized to any specific software version;
formatting the data item content, based on the selected software entity set, into a customized graph node data structure comprising a customized data item content for a software version of the selected software entity set identified based on the software version identifier, wherein the customized data item is customized based on the software version; and returning the customized graph node data structure in response to the request, wherein the selecting the selected software entity set comprises building a path order corresponding to the hierarchy of software entities, which path order is ordered to correspond to a least-specific software version to a most-specific software version, and selecting one or more software entities, of the hierarchy of software entities and corresponding to the least-specific software version, into the selected software entity set.

2. The system of claim 1, wherein the operations further comprise caching the customized graph node data structure at a front-end data service cache.

3. The system of claim 2, wherein the operations further comprise receiving a client request for the data item, and returning the customized graph node data structure from the front-end data service cache in response to the client request.

4. The system of claim 2, wherein the front-end data service cache is a REDIS cache accessible to servers of the front end data service.

5. The system of claim 1, wherein the hierarchy of software entities comprises a hierarchy of data files, and wherein software entities of the hierarchy of software entities comprise at least one of a data structure, code section, heuristic rule, data template or data.

6. The system of claim 1, wherein the data item identifier comprises a Uniform Resource Name (URN), and wherein the operations further comprise, determining data type information based on the URN, and selecting at least one software entity based on the data type information.

7. The system of claim 1, wherein the data item identifier comprises a Uniform Resource Name (URN), and wherein the operations further comprise matching at least part of the data item identifier to a regular expression.

8. The system of claim 1, wherein the selecting the selected software entity set from the hierarchy of software entities comprises accessing the hierarchy of software entities based on the version identifier and device type or device class information.

9. The system of claim 1, wherein the software version information corresponds to a token that is associated with the request, and wherein the operations further comprise, determining the version identifier from the token, and wherein the token further comprises authentication credentials.

10. A method, comprising:

receiving a request for a requested data item, in which the request is associated with a version identifier;

accessing a hierarchy of resource files, in which resource files of the hierarchy of resource files are arranged in version-based sub-hierarchies, to obtain a selected resource set comprising one or more resources files that correspond to the version identifier; and obtaining data item content for the requested data, wherein the data item content is a generic data item content not customized to any specific software version; and formatting the data item content, based on the selected resource set, into formatted data item content based on the selected resource set, wherein the formatted data item content is customized for a software version identified in the version identifier, wherein the obtaining the selected resource set comprises building a path order corresponding to the hierarchy of resource files, which path order is ordered to correspond to a least-specific software version to a most-specific software version, and selecting one or more resource files, of the hierarchy of resource files and corresponding to the least-specific software version, into the selected resource set.

11. The method of claim 10, further comprising generating a graph data structure, comprising a customized data item content for a software version, based on the formatted data item content, and caching the graph node data structure at a front-end data service cache.

12. The method of claim 11, further comprising receiving a client request for the data item, wherein the client request is associated with client-specific information, accessing the graph node data structure in the cache based at least in part on the client-specific information, and returning the graph node data structure from the front-end data service cache in response to the client request.

13. The method of claim 10, wherein the resource set comprises a version-based template file, and wherein the formatting the data item content into the formatted data item content comprises using the template file to format the data item content to match a software version.

14. The method of claim 10, wherein the selected resource set comprises a version-based expansion rule file, and wherein the method further comprises using the version-based expansion rule file to return, with a response to the request for the requested data item, at least one additional data item content, not having been formatted from a generic data item content into a formatted data item content, and the at least one additional data item content based at least in part on the software version identified in the version identifier.

15. A non-transitory machine-readable medium having machine-executable instructions, which when executed, cause a processor to perform operations comprising:

maintaining a hierarchy of resource data structures, in which resource data structures of the hierarchy of resource data structures are arranged in version-based sub-hierarchies;

selecting a resource set from the hierarchy of resource data structures based on version information associated with a data item and identifying a software version, wherein the data item is a generic data item not customized to any specific software version, and wherein selecting the resource set comprises selecting a desired file based on a hierarchical search of the resource data structures of the hierarchy of resource data structures in a search order from a more-specific software version subfolder to a less-specific software version subfolder;

formatting, based on the resource set, content of the data item into a customized graph node data structure for the software version identified in the version information, wherein the graph node data structure comprises a customized data item that is customized based on the software version; and caching the customized graph node data structure in a data cache.

16. The non-transitory machine-readable medium of claim 15, wherein the operations further comprise, receiving a client request for the data item, wherein the client request is associated with client-specific information corresponding to the version information, locating the customized graph node data structure in the cache based at least in part on the client-specific information, and returning the customized graph node data structure from the data cache in response to the client request.

17. The non-transitory machine-readable medium of claim 15, wherein the hierarchy of resource data structures comprises folders, subfolders and files, and wherein the operations further comprise building a path order in the hierarchy of resource data structures to correspond to a most-specific software version to a least-specific software version, and wherein selecting the resource set further comprises employing the path order as the search order.

18. The non-transitory machine-readable medium of claim 15, wherein the formatting the content of the data item into the customized graph node data structure based on the version information comprises filtering the content.

19. The non-transitory machine-readable medium of claim 15, wherein the data item is identified by a Uniform Resource Name (URN), and wherein the operations further comprise determining data type information based on the URN, and selecting the resource set based at least in part on the data type information.

20. The non-transitory machine-readable medium of claim 15, wherein the selecting the resource data set further comprises selecting one or more resource data structures corresponding to a least-specific software version into the selected resource set.

* * * * *